(12) United States Patent
Hiller et al.

(10) Patent No.: US 6,452,753 B1
(45) Date of Patent: Sep. 17, 2002

(54) UNIVERSAL LOAD/UNLOAD RAMP

(75) Inventors: Bernhard Hiller, San Jose; Dick Yaeger, Sunnyvale, both of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/923,500

(22) Filed: Aug. 6, 2001

(51) Int. Cl.[7] ................................................. G11B 5/54
(52) U.S. Cl. ................................................. 360/254.7
(58) Field of Search ........................... 360/254.7, 254.8, 360/254.9, 255

(56) References Cited

U.S. PATENT DOCUMENTS

| | | | |
|---|---|---|---|
| 5,027,241 A | 6/1991 | Hatch et al. | 360/105 |
| 5,696,649 A | 12/1997 | Boutaghou | 360/97.03 |
| 5,984,104 A * | 11/1999 | Schott et al. | 206/728 |
| 2001/0000681 A1 * | 5/2001 | Iida et al. | 360/255 |

* cited by examiner

*Primary Examiner*—David Hudspeth
*Assistant Examiner*—Angel Castro
(74) *Attorney, Agent, or Firm*—Sheridan Ross P.C.

(57) ABSTRACT

This invention generally relates to dynamic load/unload technology in magnetic disk drive assemblies and, more particularly, to a combination of load/unload ramps with shipping combs and/or limiters, such as disk, tab, flexure, suspension or arm limiters, to provide protection to the head assemblies, arms and disks of the magnetic disk drive assemblies.

36 Claims, 4 Drawing Sheets

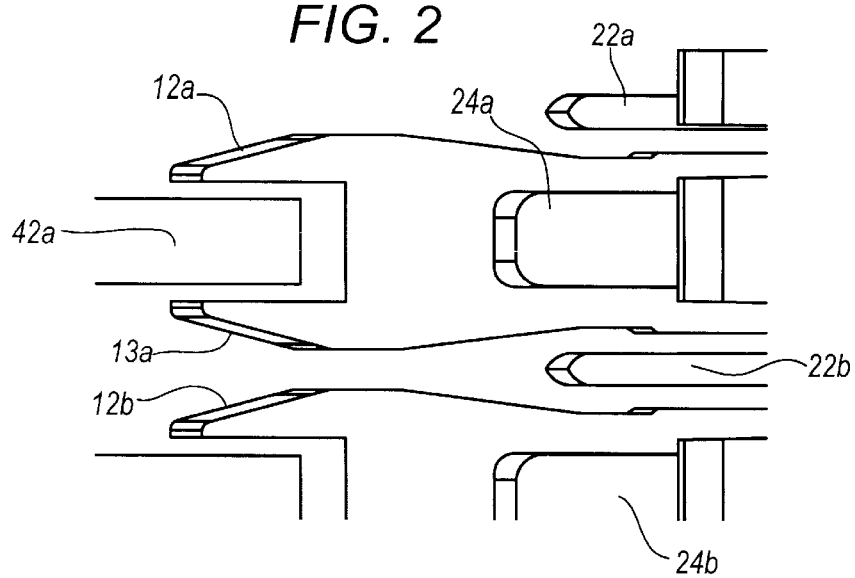
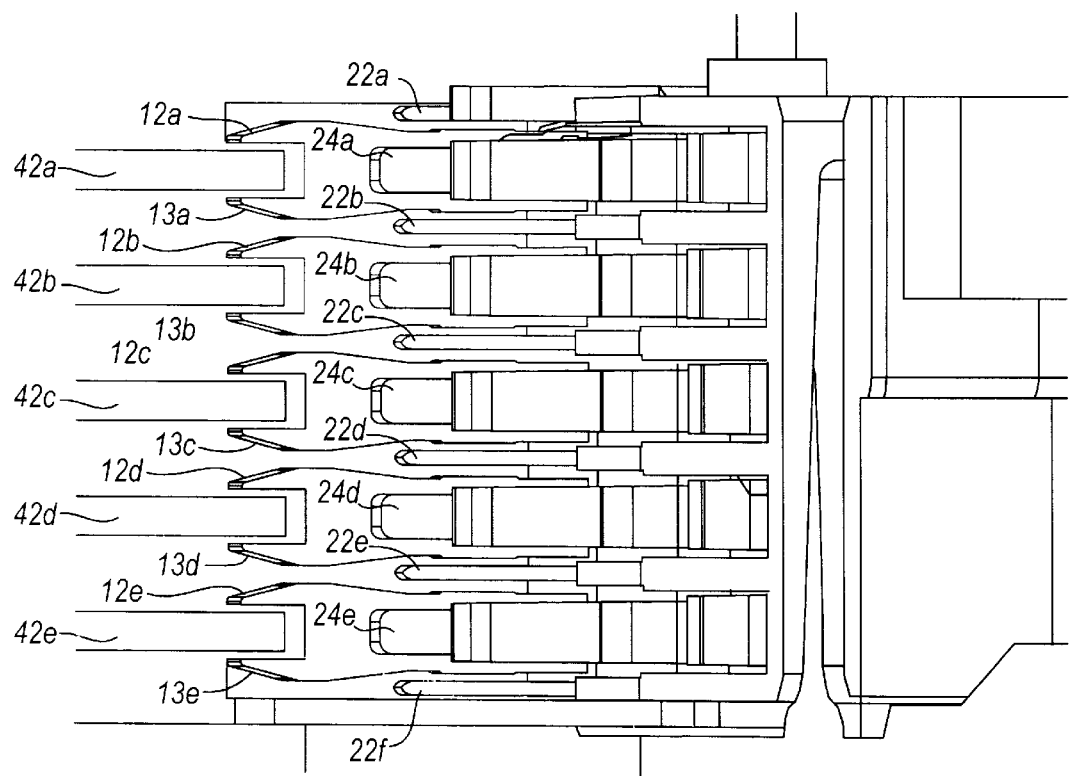

UNIVERSAL LOAD/UNLOAD RAMP

FIELD OF THE INVENTION

This invention generally relates to dynamic load/unload technology in magnetic disk drive assemblies and, more particularly, to a combination of load/unload ramps with shipping combs and/or limiters, such as disk, tab, flexure, suspension or arm limiters.

BACKGROUND OF THE INVENTION

Disk drive memory systems store digital information on magnetic disks, which typically are divided into concentric tracks, each of which are in turn divided into a number of sectors. The disks are rotatably mounted on a spindle and information is accessed by read/write head assemblies mounted on pivoting suspension arms able to move radially over the surface of the disks. The radial movement of the head assemblies allows different tracks to be accessed from the inside diameter to the outside diameter of the disks. Rotation of the disks allows the read/write heads to access different sectors of each track.

In general, head assemblies are part of an actuator assembly, which also typically includes a suspension assembly, a flexure member and an arm, among other things. Head assemblies typically include a magnetic transducer to write data onto a disk and/or read data previously stored on a disk. Head assemblies also typically include a body or slider having an air bearing surface which, in part, functions during operation to position the magnetic transducer a specified distance from the surface of the spinning disk. In general, it is advantageous to position the magnetic transducer as close as possible to the disk.

A primary goal of disk drive assemblies is to provide maximum recording density on the disk. A related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the magnetic transducer and recording medium resulting in failure of the magnetic transducer or catastrophic failure.

Similar to recording, the efficiency of reading data from a disk increases as the read element is moved closer to the disk. Because the signal to noise ratio increases with decreasing distance between the magnetic transducer and the disk, moving the magnetic transducer closer to the disk increases reading efficiency. As such, magneto-resistive heads in current disk drives typically operate at an average spacing from the disk surface of approximately 20 nanometers to up to approximately 50 nanometers. This range of spacing is required due to several reasons, including manufacturing tolerances of the components, texturing of the disk surface and environmental conditions, such as altitude and temperature. These factors, and others, result in variances in the spacing between the magnetic transducer and the disk, which can cause the magnetic head to fly too low and contact the spinning disk.

The dynamics of an operating magnetic disk drive assembly require a study and understanding of the interaction between the head assembly and the disk. In general, the study of the design, friction, wear and lubrication of interacting surfaces in relative motion is referred to as tribology. Also, the term head stack assembly generally refers to the head assembly, the suspension and the e-block.

In typical applications, when power to the disk drive is turned off, the suspension arm moves to the inner diameter of the disk and directs the head assembly to land on a specified area of the disk, commonly referred to as the Laser Texture Zone, located at the extreme inner diameter of the disk. At rest, the head assembly rests on the surface of the disk in the Laser Texture Zone. When power is turned back on, the disk starts to spin, generating a body of moving air above the disk that lifts the head assembly above the surface of the disk. The head assembly then is moved to the desired location relative to, and above, the spinning disk.

The Laser Texture Zone is designed to provide sufficient length and breadth to accommodate the landing of the head assembly onto the disk during power off, and to accommodate the lifting of the head assembly off of the disk during power on. The Laser Texture Zone obtains its name from bumps created by a laser that results in a rough surface to reduce stiction of the recording head when resting on the disk. Because of the interaction between the head assembly and disk, including the forces imparted during start and stop operations and the direct contact during power off, the Laser Texture Zone typically is not intended to store information.

Optimally, the head assembly contacts the disk only within the Laser Texture Zone. The remainder of the disk, other than the Laser Texture Zone, is designed to optimize the recording, storing and retrieving of information. This remainder of the disk, referred to as the Data Zone, extends outwards to the outside diameter of a typical disk. To protect the disk from impact forces and stiction forces from the head assembly, among other things, the base magnetic layer of a disk typically is covered with a protective layer of carbon overcoat and an outer layer of lubricant.

A more recent development in head-disk assembly tribology is dynamic load/unload technology. Rather than designing the head assembly to land on, rest on and lift off of the surface of the disk in the Laser Texture Zone, dynamic load/unload technology suspends the head assembly on a ramp, typically located in proximity to or outside of the outside diameter of the disk, although it may be located at any fixed radius. More specifically, a ramp is built into the housing of the magnetic disk drive assembly overhanging the outer most portion of the disk or adjacent the outside diameter of the disk. A tab or an extension of the suspension arm rests on the ramp, thereby suspending the head assembly, either above the disk or just beyond the outside diameter of the disk. Even at rest, the head assembly is designed to not be in direct contact with any part of the disk. When the power is turned on and after the disk is spinning, the head assembly is designed to move down the ramp and fly above the spinning disk.

In a conventional disk drive using contact start/stop technology, the head assemblies typically are manufactured and then transported to another location for assembly into the disk drive. To protect the head assemblies during transport, a shipping comb typically is utilized, which holds apart the opposing head assemblies and protects the entire assembly. Such a conventional shipping comb is made of relatively inexpensive plastic and is discarded after use.

To assemble head assemblies into a conventional disk drive using contact start/stop technology, the shipping comb typically is replaced with a merge tool (also called a process comb), which holds apart the opposing head assemblies, among other things. The merge tool also positions each head assembly over, and lowers each head assembly onto, the slowly spinning disk. This process, commonly referred to as merging, places each head assembly onto the surface of the disk, typically on a portion of the outer diameter. The merge tool then is swung outwardly and removed, and the head assemblies move to a parked position, typically on an inner portion of each disk. Due to the complex nature of the process, there is a possibility of yield loss during assembly, e.g., dinging disks, bending suspensions, etc. Dynamic load/unload technology facilitates the merging process by providing a surface on which to park the tabs of the suspension arms. A merge tool is no longer needed to spread the head assemblies during assembly.

However, even when dynamic load/unload technology is used, a shipping comb is still needed to protect the head assembly during shipping, storage and handling prior to assembly into the disk drive. Of particular importance is the protection of the distal end of the head assemblies, where there are fragile connections and other components. For example, a shipping comb advantageously includes protection for sliders and flexures, particularly as those components become smaller and more susceptible to damage. However, as the head assembly and its components become smaller, it becomes increasingly difficult to maintain sufficient room for such protection. For example, as the head assembly becomes smaller, the merge tool has less area on which to hold onto, leaving little or no room for a shipping comb. One solution is simply to eliminate the part of the shipping comb that provides head assembly protection. Also, as suspensions become shorter, there is less space for a shipping comb to be attached to the suspension between the suspension bending radius and the slider, particularly without damaging it.

One existing solution to this problem is to not touch the load beam between the slider and the swage point, but rather to use a center tab at the end of the suspension for merging purposes. Tabs on existing dynamic load/unload ramps are generally too short for the merging tool and ramp to coexist. This center tab would be the same tab for dynamic load/unload, although there is a compromise between the design objectives of merging, which requires a relatively longer tab, and of dynamic load/unload, which requires a relatively shorter tab.

A significant advantage of dynamic load/unload technology is the reduction of "head slap," the sudden impact of the head assembly onto the disk during non-operational shock. This advantage is achieved by parking the arm of the head assembly off the outside diameter of the disk and by providing a ramp for takeoff and landing. However, dynamic load/unload technology often does not prevent other impacts between the disk and head stack assembly, e.g., arm to disk contact.

It is advantageous to park the arm close to the disk to reduce inertia and seek times, and to reduce come-ready time. To minimize seek times, the arm is typically parked overlapping at least a portion of the outside diameter of the disk. This positioning of the arm creates the possibility of undesirable contact between the arm/swage plate and the disk. As a result, arm limiters and/or suspension limiters may be necessary to protect both the head assembly and the disk. Even if the arm is parked off of the outside diameter of the disk, it may be necessary to limit suspension motion. Suspension motion during shock can cause excessive flexure motion, resulting in deformation of the flexure, which negatively affects pitch and roll, static attitude and ultimately proper flying of the heads. However, installing such limiters in the head assembly as an extra part is difficult technically and expensive in view of current assembly cost and time requirements.

A standard industry test of disk drive assemblies, referred to as a tilt drop test, creates relatively short shocks of approximately one third of a millisecond. In the absence of arm and suspension limiters, a typical disk drive assembly may not pass these tests. If such limiters are necessary, they are an extra piece of equipment, typically an extra screw, and must be installed after the arm, increasing material cost, assembly time and assembly complexity. Installing an additional piece also will result in yield loss, by damaging some drives during the assembly process.

As such, a need exists for providing head assembly protection in a magnetic disk drive assembly incorporating dynamic load/unload ramp technology, as well as providing motion limiters for various components.

SUMMARY OF THE INVENTION

This invention generally relates to dynamic load/unload technology in magnetic disk drive assemblies and, more particularly, to combining load/unload ramps with shipping combs and/or limiters, such as disk, tab, flexure, suspension or arm limiters.

In one embodiment of the invention, a unitary ramp comprises an in drive ramp for each head assembly in a disk drive assembly, a shipping comb to protect the head assembly during shipping prior to assembly into the disk drive assembly and to aid an assembly and one or more limiters to restrict the movement of various components of the head assembly prior to after such assembly. Unlike conventional shipping combs, the unitary ramp of the present invention is not removed and discarded during assembly of the disk drive assembly.

Further, the unitary ramp may include a limiter for one or more of the arms, tabs, flexures and/or suspensions of the disk drive assembly. Such a limiter limits the movement of and provides protection for the designated component, during shipping, prior to and during assembly into the disk drive assembly, and thereafter.

DESCRIPTION OF THE DRAWINGS

FIG. 2 is a side view depicting a portion of one embodiment of a dynamic load/unload ramp assembly of the present invention; and FIG. 3 is a side view depicting a portion of one embodiment of a dynamic load/unload ramp assembly of the present invention;

DETAILED DESCRIPTION OF THE INVENTION

This invention generally relates to dynamic load/unload technology in magnetic disk drive assemblies and, more particularly, to combining load/unload ramps with shipping combs and/or limiters, such as disk, tab, flexure, suspension and arm limiters, to protect the head assembly from shock and other forces during transport and use.

Figure 1:
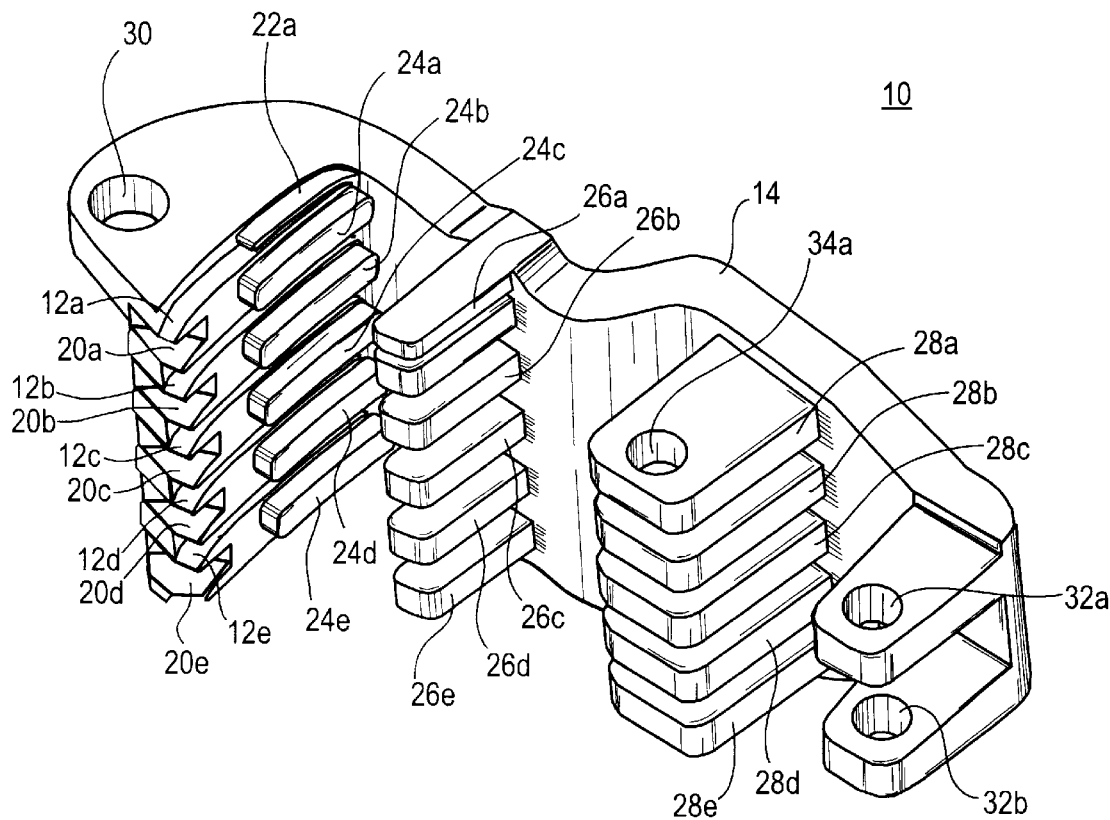
FIG. 1 is a perspective view depicting one embodiment of a dynamic load/unload ramp assembly of the present invention.

In one embodiment of the invention, as shown in FIG. 1, a unitary ramp 10 comprises an in drive ramp 12a and a shipping comb 14 for a disk drive assembly utilizing five disks. The in drive ramp 12a provides an inclined surface onto which a tab on the head assembly rides up and rests during power off. The angle of the incline of the in drive ramp 12a is sufficiently shallow to allow the head assembly to scale the height of the in drive ramp 12a during power off, preferably approximately 10 to 25 degrees, and most preferably approximately 15 degrees. The in drive ramp 12a is of sufficient size to support the tab on the head assembly during landing, parking and take off, and preferably is approximately 0.8 to 1.6 mm in width and 3 to 15 mm in length, and more preferably about 1.0 mm in width and 10 mm in length. The in drive ramp 12a typically will overhang a portion of the disk by approximately 1.0 mm. Each head assembly in the disk drive assembly preferably is provided with a separate in drive ramp.

A shipping comb 14 also is provided to hold apart during shipping the suspensions of the head assemblies. In the embodiment of the invention shown in FIG. 1, the in drive ramps 12a–e and the shipping comb 14 are constructed as a unitary piece identified as unitary ramp 10. Unitary ramp 10 may be constructed of a variety of materials that provide low friction and low wear, and that minimize the generation of particles from the frequent contacts with the head assembly. Such particles, even if very small, may contaminate the interior of the disk drive assembly. Suitable materials generally include thermoplastic polymers, plastic coated metals such as aluminum or steel, metals over-molded with thermoplastic polymers, or combinations thereof. Preferably, unitary ramp 10 is constructed of a Teflon-filled liquid crystal polymer commercially known as Vectra and available from Ticona Company. More preferably, unitary ramp 10 is constructed from an acetal homopolymer commercially known as Delrin and available from E. I. DuPont de Nemours & Co. Unitary ramp 10 may be formed in a variety of ways, such as machining, and preferably is formed by injection molding.

The unitary ramp 10 preferably comprises structure to facilitate its connection to at least a portion of the magnetic disk drive assembly. In a preferred embodiment of the invention shown in FIG. 1, the unitary ramp 10 comprises a top cover screw hole 30, a shipping peg hole 32, a second shipping peg hole 34a through arm limiter 28a, similar second shipping peg holes (not shown) through corresponding arm limiters 28b–e, a proximal snap mount (not shown), and a distal snap mount (not shown).

The overall configuration of the unitary ramp 10 also facilitates its installation and use. Preferably, unitary ramp 10 is shaped to closely follow the outline of the head arm assembly, which better protects the head arm assembly during shipping. The closeness of the unitary ramp 10 to the head arm assembly is dictated by the available space in the disk drive.

The unitary ramp 10 also may comprise one or more combs of limiters for additional shock protection of the head assembly or the disk during assembly, storage, transport and/or use. Preferably, the unitary ramp 10 comprises a comb of disk limiters 20a–e, tab limiters 22a, flexure limiters 24a–e, suspension limiters 26a–e and arm limiters 28a–e. Unitary ramp 10 may include any number of such limiters in any combination, depending on the application. Preferably, if a disk limiter is desired to be included in the unitary ramp 10, a disk limiter is provided for each disk in the disk drive assembly, as shown in FIG. 1. Similarly, if a tab limiter, flexure limiter, suspension limiter, or arm limiter is desired to be included as part of the unitary ramp 10, preferably such a limiter is provided for each head assembly in the disk drive assembly, also as shown in FIG. 1. Most preferably, the unitary ramp 10 comprises an in drive ramp, disk limiter, tab limiter, flexure limiter, suspension limiter and arm limiter for each disk surface in the disk drive assembly.

The comb of disk limiters 20a–e generally provides a limitation on the vertical movement of the disks while the head assemblies are at rest on the corresponding in drive ramp 12a–e (during non-operation), although vertical limitation of the disk during operation is possible. The disk limiters 20a–e preferably extend over at least a portion of the disk, more preferably by approximately 1 to 3 mm. Most preferably, the comb of disk limiters 20a–e is formed by designing the in drive ramps 12a–e to overhang the outside diameter of the disk, approximately 1.5 mm. The comb of disk limiters 20a–e must be sized to receive at least a portion of the disk, which typically is approximately 0.8 to 1.27 mm thick. As such, the openings of each disk limiter 20a–e which receives at least a portion of the disk are preferably approximately 1 to 2 mm in height, providing a clearance of approximately 0.1 to 0.3mm.

The in drive ramps 12a–e also may be provided with a second comb of disk limiters (not shown). For example, the arm limiters 28a–e maybe extended over the disk and notched to provide a second set of disk limiters. In principle, the same could be done with the suspension limiters or alternative structure on the unitary ramp.

The unitary ramp 10 also may comprise a comb of tab limiters 22a, which preferably are a slot between each ramp rib for the load tab to rest. Tab limiters 22a are designed to prevent the suspension from lifting off during non-operational shock. Preferably, the clearance between the tab limiter 22 and the tab is as small as possible, preferably 0.05 to 0.5 mm and more preferably approximately 0.1 mm. Preferably, a tab limiter is provided for each suspension in the disk drive assembly.

A comb of flexure limiters 24a–e may also be provided as part of the unitary ramp 10. In general, flexure limiters 24a–e are designed to limit the vertical motion of the flexure and the slider during non-operational shock. Preferably, the comb of flexure limiters 24a–e is approximately 1 to 10 mm wide, with a relatively wide dimension if one is concerned primarily with operational shock and a relatively narrow dimension if one is concerned primarily with non-operational shock. Flexure limiters 24a–e protrude from the surface of the unitary ramp 10 approximately 0.2 mm–1.0 mm, the exact value being defined by tolerance analysis. Although flexure limiters may be designed into the suspension, it is generally more cost effective and preferable to design them directly into the in drive ramp.

The unitary ramp 10 may also comprise a comb of suspension limiters 26a–e. In general, suspension limiters are designed to limit the motion of the suspension during non-operational shock. Suspension limiters have a beneficial shock block effect not only during drive operation, but also during transport of the head stack assembly. Suspension limiters are especially useful to limit the amount of movement of the suspension where the suspension bending mode and the arm bending mode can not be sufficiently decoupled as desired. For example, when the suspension and the arm are in resonance with each other (the suspension bending mode and the arm bending mode are coupled), shock will cause the heavier arm to create significantly greater movement of the suspension. Therefore, it is desirable for the suspension to be stiffer than the arm, so they are out of resonance with each other. If the desired degree of decoupling is not attained, then a suspension limiter is advantageous to limit this movement.

A comb of arm limiters 28a–e may also be provided as part of the unitary ramp 10. In general, arm limiters 28a–e are designed to limit arm motion during non-operational shock and to avoid excessive coupling of arm motion into the suspension. Preferably, the comb of arm limiters 28a–e is positioned approximately near the swage plates used to attach the suspension to the arm. Arm limiters have a beneficial shock block effect not only during drive operation, but also during transport of the head stack assembly. For example, one may design the arm to park in a position with no disk overlap. However, this carries disadvantages, such as adding to seek times and placing the arm at a wider angle relative to the disk, causing space constraints and added costs. Therefore, it is desirable to overlap the disk with at least a portion of the arm, which creates the possibility of arm to disk contact. Preferably, a portion of the arm overlaps the disk and an arm limiter overlaps the arm. More preferably, there is no overlap between the arm limiter and the disk.

Referring now to FIG. 2, a side view of a portion of unitary ramp 10 is shown along with a portion of disk 42a. In drive ramp 12a provides an inclined surface onto which a tab on the head assembly for one side of disk 42a rides up and rests during power off. Similarly, in drive ramp 13a provides an inclined surface onto which a tab on the opposing head assembly for the opposing side of disk 42a rides up and rests during power off. FIG. 2 also shows tab limiters 22a and 22b and flexure limiters 24a and 24b.

FIG. 3 shows in drive ramps 12a–e, one for each of the head assemblies (not shown) for a first side of each of disks 42a–e, and in drive ramps 13a–e, one for each of the head assemblies (not shown) for a second side of each of disks 42a–e. FIG. 3 also shows flexure limiters 24a–e, one for each of disks 42a–e and tab limiters 22a–f, a comb for each of disks 42a–e.

Figure 4:
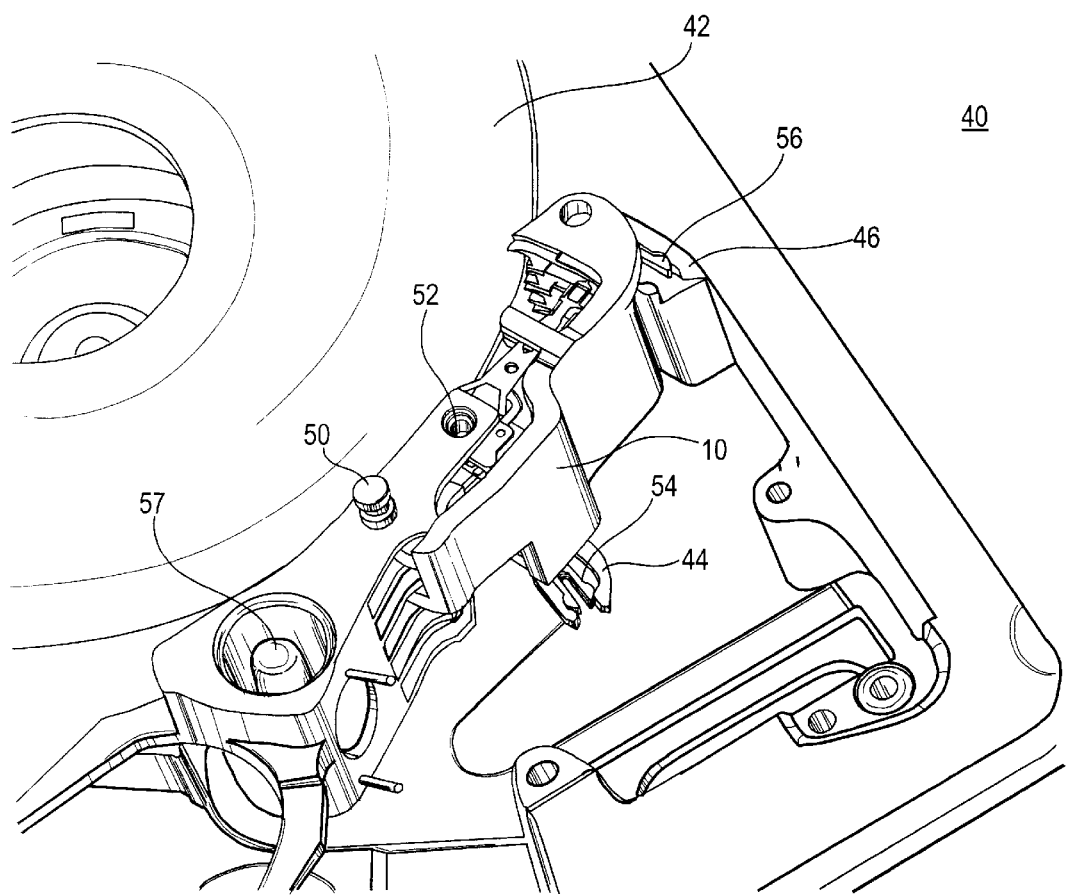
FIG. 4 is a perspective view of the dynamic load/unload ramp assembly of FIG. 1 partially installed in a disk drive assembly.

Referring now to FIG. 4, a unitary ramp 10 is shown in the process of being installed as part of a disk drive assembly 40. The unitary ramp 10 is preferably attached to the head stack assembly by the head stack assembly manufacturer, at the time of its manufacture, by merging it via the distal end. A shipping peg 50 is inserted through the shipping peg hole 32 of the unitary ramp 10 and through a hole (not shown) in the suspension arm 46. A second shipping peg (not shown) may optionally be inserted through the second shipping peg hole 34 of the unitary ramp 10 and through a hole 52 in the suspension arm 46, preferably distal from the shipping peg 50.

The unitary ramp 10 allows a variety of mechanisms for connection to the disk drive assembly 40, including snap mounting, peg mounting or friction mounting. The connection mechanism also provides protection of the electrical connection between the pre-amplifier and the head assembly during the attachment process and during transport. Preferably, the connection mechanism comprises an arm having a protrusion with a groove, into which the these connections are placed. The components of the unitary ramp 10 are preferably aligned with these protrusions. Preferably, a peg mechanism is used, in which there is typically a relatively small overlap of approximately 0.5 mm. Although a snapping mechanism alternatively may be used, a snapping mechanism requires movement over a relatively longer distance for clearance to be achieved. Therefore, a snapping mechanism typically necessitates a larger angle than pegs to separate the head stack assembly and the unitary ramp 10 in the park position. The larger angle may not be available in the drive.

Figure 5:
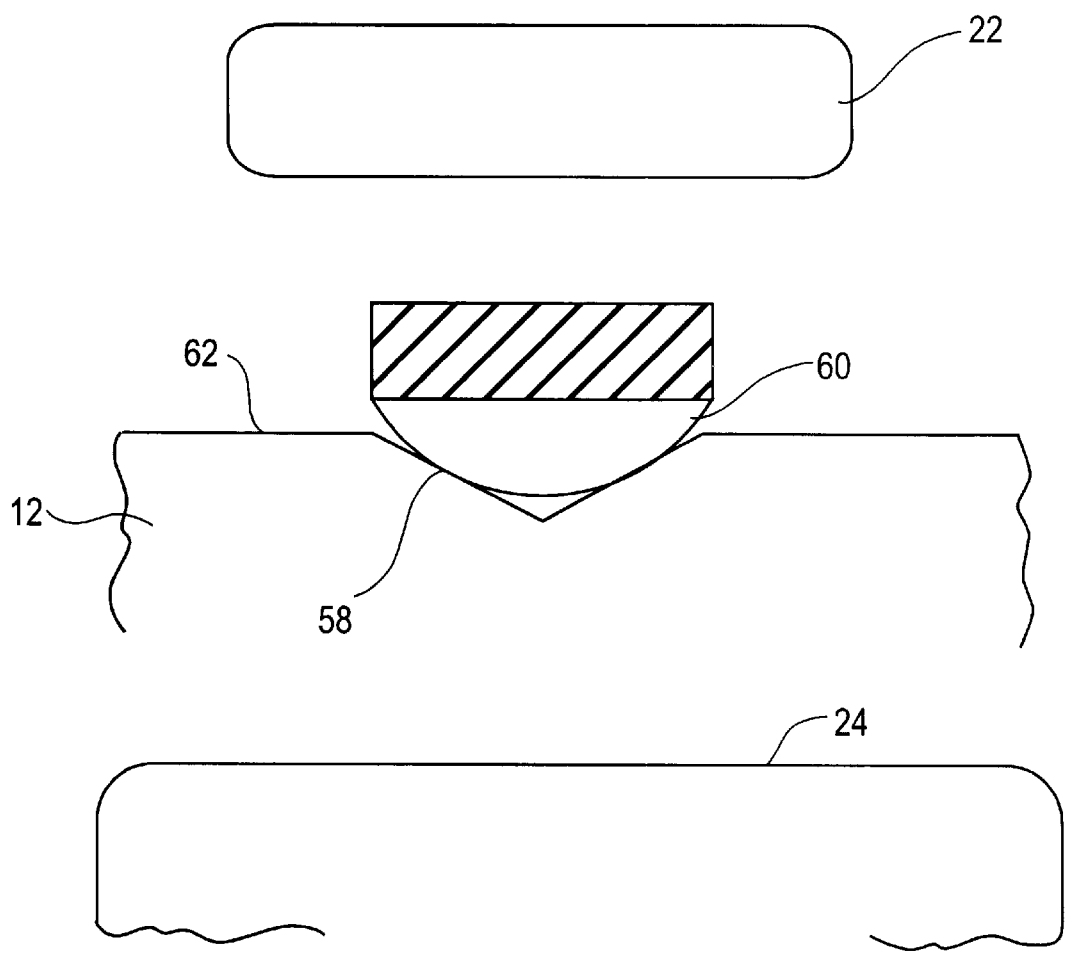
FIG. 5 is a side view of the dynamic load/unload ramp assembly of the present invention depicting a tab resting on a detent with the arm in a parked position.

In general, the preferred embodiment shown in FIGS. 1 and 4 utilizes a shipping peg 50, tab friction and a small detent to hold the shipping comb 14 of the unitary ramp 10 in place. As shown in FIG. 5, the upper surface 62 of in drive ramp 12 includes a detent 58 onto which may rest the load tab 60 of a head assembly. FIG. 5 also depicts a tab limiter 22 and a flexure limiter 24. Tab friction and detent are likely sufficient to hold the shipping comb in place in a fully populated drive, such as a server drive. However, in depop drives, tab friction on the shipping comb is lower since there are less disks, typically one or two. The lower tab friction may not hold the shipping comb in place satisfactorily. As an alternate, a double snap, double peg or combination of snap and peg may be used for that purpose. The swage hole 52 may alternatively be used as a peg hole.

Referring again to FIG. 4, the unitary ramp 10 and the head stack assembly is placed in the head disk assembly on the pivot shaft 57. The unitary ramp 10/head stack assembly is pivoted counter-clockwise into a proper position, where it snaps into proximal snap mount 44 and distal snap mount 46. Most preferably, the proximal snap mount 44 and the distal snap mount 46 are machine cut into the baseplate of disk drive assembly 40. The shipping peg 50 and, if present, the second shipping peg (not shown) are preferably then removed and discarded.

Preferably, the head stack assembly is again pivoted counter-clockwise into a position somewhere between park and load, more preferably far enough from the park position so that the outer diameter stop and the latch, which is typically attached to the top half of the voice coil motor, can be installed without interference. The top is installed with the outside diameter latch. The head stack assembly is pivoted back clockwise until it latches and is now in the park position. To minimize wear, there is no direct contact between the unitary ramp 10 and the head stack assembly in the park position. Installation of the unitary ramp 10/head stack assembly is completed by fastening the unitary ramp 10 with a screw through the top cover of the disk drive assembly into the top cover screw hole 30. Demerge is essentially the reverse of the above process.

Alternatively, the head stack assembly may be moved from the shipping position to the park position after the cover is installed. In one embodiment, the servo-track-write access slot is used, together with a flexible latch and outer diameter stop design. After mounting the head stack assembly with the arm in the shipping position, the arm is moved into the park position using the servo-track-write access slot. Although in a typical configuration, the latch may block such access, a flexible latch or alternative latch mechanism may be employed to remove this block.

Alternatively, the unitary ramp 10 maybe attached to the disk drive assembly 40 with one or more screws. To reduce creep caused by plastic parts, the unitary ramp 10 may be molded over or around a metal insert with a through hole. To minimize tolerance build up at the outer disks, the mounting plane preferably is positioned directly between middle disks, in drives with even numbers of disks, or in the middle of the middle disk, in drives with odd numbers of disks. If process tooling holds the unitary ramp 10 securely in place during the assembly process, the snapping features in the unitary ramp 10 may also be eliminated, along with the first pivoting step to snap the unitary ramp 10 in place. Although assembly time may be improved through the use of captive screws, the increased expense and assembly time in utilizing any such screws limit this alternative.

Developing disk drive assembly designs may pose additional constraints on the installation of the unitary ramp 10. For example, the goal of eliminating all screws within the disk drive assembly necessitates that the unitary ramp 10 be connected with its own features, such as the proximal snap mount 54 and the distal snap mount 56 shown in FIG. 4. Numerous alternative mechanisms may be employed to snap the unitary ramp 10 in place or to otherwise connect the unitary ramp 10 to the disk drive assembly 40. Also, a limitation on screw length, such as specifying that only 1 or 2 screw types are allowed, results in a less than optimal high mounting plane for the unitary ramp 10, which must then be considered in the tolerance analysis.

The unitary ramp of the present invention has several advantages over existing in drive ramp and shipping comb designs. For example, protection of the head assembly is improved by keeping the head assemblies apart during transport. Existing designs simply held apart the suspensions. With the unitary ramp, no separate shipping comb is required to be constructed, installed, removed or otherwise handled. Also, there is no need to dock a shipping comb against the in drive ramp for the initial loading of the head assembly onto the ramp. This is usually a difficult process due to the space limitations and the requirement of smooth, low wear transition of the shipping comb onto the ramp.

Similarly, assembly time and expense is reduced with the unitary ramp of this invention. For example, the ramp need not be pre-installed before head merge, but is directly installed by a simple procedure. Merge and demerge tooling is also simplified, which is reduced to the unitary ramp 10 itself.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the present invention. The embodiment described herein is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A disk drive assembly comprising:
   a housing;
   a hub rotatably mounted to a shaft;
   at least one disk mounted on said hub and rotatable relative to said housing;
   an actuator assembly mounted to pivot relative to said housing, said actuator assembly having a proximate and distal end; and
   a unitary ramp comprising an in drive ramp and a shipping comb;
   said in drive ramp mounted to said housing proximate said disk, said in drive ramp adapted to receive at least a portion of said actuator assembly during non-operation of the actuator arm; and,
   said shipping comb mounted to said housing and adapted to inhibit movement of at least a portion of said disk drive assembly.

2. The disk drive of claim 1, wherein said actuator assembly comprises a suspension assembly disposed on said actuator arm, and further comprising a suspension limiter disposed on and a unitary part of said unitary ramp, said suspension limiter adapted to inhibit movement of at least a portion of said suspension assembly.

3. The disk drive of claim 2, wherein said unitary ramp is adapted to be connected to said suspension assembly by at least one peg.

4. The disk drive of claim 1, wherein said actuator assembly comprises a flexure member disposed on said actuator assembly, and further comprising a flexure limiter disposed on and a unitary part of said unitary ramp, said flexure limiter adapted to inhibit movement of at least a portion of said flexure member.

5. The disk drive of claim 1, wherein said actuator assembly comprises an arm disposed on said actuator assembly, and further comprising an arm limiter disposed on and a unitary part of said unitary ramp, said arm limiter adapted to inhibit movement of at least a portion of said arm.

6. The disk drive of claim 5, wherein said head assembly includes a tab, and further comprising a tab limiter disposed on and a unitary part of said unitary ramp, said tab limiter adapted to inhibit the movement of at least a portion of said tab of said head assembly.

7. The disk drive of claim 1, further comprising a disk limiter disposed on and a unitary part of said unitary ramp, said disk limiter adapted to inhibit the movement of at least a portion of said disk of the disk drive assembly.

8. The disk drive of claim 1, further comprising a snap fit connector adapted to attach said unitary ramp to the disk drive assembly.

9. The disk drive of claim 1, further comprising a plurality of limiter members integrally formed with said unitary ramp and adapted to inhibit the movement of at least a portion of the actuator assembly.

10. The disk drive of claim 9, wherein said plurality of limiter members comprises at least two of the group consisting of a suspension limiter, arm limiter, disk limiter, flexure limiter and tab limiter.

11. The disk drive of claim 1, wherein said disk drive assembly comprises at least two actuator assemblies, including a head assembly disposed on each of said at least two actuator assemblies, and at least two of said disks, and wherein said unitary ramp further comprises an in drive ramp for each of said head assemblies, an arm limiter for each of said head assemblies and a disk limiter for each of said disks.

12. The disk drive of claim 1, wherein said disk drive assembly comprises at least two actuator assemblies, including a head assembly disposed on each of said at least two actuator assemblies, and at least two of said disks, and wherein said unitary ramp further comprises an in drive ramp for each of said head assemblies.

13. The disk drive of claim 1, wherein said unitary ramp is adapted to be connected to said disk drive assembly by a snap fit connector.

14. The disk drive of claim 1, wherein said unitary ramp is adapted to be connected to said disk drive assembly without the use of an internal screw.

15. The disk drive of claim 1 further comprising a plurality of limiter members integrally formed with said unitary ramp and adapted to limit the movement of at least a portion of the actuator assembly, said plurality of limiter members comprising at least three of the group consisting of a suspension limiter, arm limiter, disk limiter, flexure limiter and tab limiter.

16. The disk drive of claim 1 further comprising a plurality of limiter members integrally formed with said unitary ramp and adapted to limit the movement of at least a portion of the actuator assembly, said plurality of limiter members comprising at least four of the group consisting of a suspension limiter, arm limiter, disk limiter, flexure limiter and tab limiter.

17. The disk drive of claim 1 further comprising a plurality of limiter members integrally formed with said unitary ramp and adapted to limit the movement of at least a portion of the actuator assembly, said plurality of limiter members comprising a suspension limiter, arm limiter, disk limiter, flexure limiter and tab limiter.

18. A unitary ramp for a disk drive assembly comprising a disk and an actuator assembly, including a head assembly and a suspension assembly, said unitary ramp comprising, an in drive ramp adapted to receive at least a portion of the head assembly during non-operation of the disk drive assembly, and a shipping comb adapted to protect at least a portion of the disk drive assembly.

19. The unitary ramp of claim 18, further comprising a suspension limiter disposed on and a unitary part of said unitary ramp, said suspension limiter adapted to inhibit movement of at least a portion of the suspension assembly.

20. The unitary ramp of claim 19, wherein said unitary ramp is adapted to be connected to said suspension assembly by at least one peg.

21. The unitary ramp of claim 18, wherein the actuator assembly comprises a flexure member disposed on the actuator assembly, and further comprising a flexure limiter disposed on and a unitary part of said unitary ramp, said flexure limiter adapted to inhibit movement of at least a portion of the flexure member.

22. The unitary ramp of claim 18, further comprising an arm limiter disposed on and a unitary part of said unitary ramp, said arm limiter adapted to inhibit movement of at least a portion of said actuator assembly.

23. The unitary ramp of claim 22, wherein said head assembly includes a tab, and further comprising a tab limiter disposed on and a unitary part of said unitary ramp, said tab limiter adapted to inhibit the movement of at least a portion of said head assembly.

24. The unitary ramp of claim 18, further comprising a disk limiter disposed on and a unitary part of said unitary ramp, said disk limiter adapted to inhibit the movement of at least a portion of the disk of the unitary ramp assembly.

25. The unitary ramp of claim 18, further comprising a snap fit connecter adapted to attach said unitary ramp to the disk drive assembly.

26. The unitary ramp of claim 18, further comprising a plurality of limiter members integrally formed with said unitary ramp and adapted to inhibit the movement of at least a portion of the actuator assembly.

27. The unitary ramp of claim 26, wherein said plurality of limiter members comprises at least two of the group consisting of a suspension limiter, arm limiter, disk limiter, flexure limiter and tab limiter.

28. The unitary ramp of claim 18, wherein the disk drive assembly comprises at least two disks and at least two actuator assemblies, including a head assembly disposed on each actuator assembly, wherein said unitary ramp further comprises an in drive ramp for each of the head assemblies, an arm limiter for each of the head assemblies and a disk limiter for each of the disks.

29. The unitary ramp of claim 18, wherein the disk drive assembly comprises at least two disks and at least two actuator assemblies, including a head assembly disposed on each actuator assembly, and wherein said unitary ramp further comprises an in drive ramp for each of the head assemblies.

30. The unitary ramp of claim 18, wherein said unitary ramp is adapted to be connected to said disk drive assembly by a snap fit connector.

31. The unitary ramp of claim 18, wherein said unitary ramp is adapted to be connected to said disk drive assembly without the use of an internal screw.

32. A unitary ramp for a disk drive assembly comprising a disk and an actuator assembly comprising a suspension assembly, a flexure member, a head assembly, a tab and an arm, said unitary ramp comprising:

an in drive ramp adapted to receive at least a portion of said head assembly during non-operation, a shipping comb adapted to protect at least a portion of said disk drive assembly, a suspension limiter disposed on and a unitary part of said unitary ramp, said suspension limiter adapted to inhibit movement of at least a portion of said suspension assembly, a flexure limiter disposed on and a unitary part of said unitary ramp, said flexure limiter adapted to inhibit movement of at least a portion of said flexure member, an arm limiter disposed on and a unitary part of said unitary ramp, said arm limiter adapted to inhibit movement of at least a portion of said arm, a tab limiter disposed on and a unitary part of said unitary ramp, said tab limiter adapted to inhibit movement of at least a portion of said head assembly, and a disk limiter disposed on and a unitary part of said unitary ramp, said disk limiter adapted to inhibit movement of at least a portion of said disk.

33. A method of assembling a disk drive assembly comprising, providing a unitary ramp comprising at least one in drive ramp capable of receiving at least a portion of a head assembly during non-operation of the disk drive assembly and a shipping comb capable of restricting the movement of at least a portion of said disk drive assembly, connecting at least a portion of said unitary ramp in a first position to a housing of the disk drive assembly, installing at least one disk to said housing, and positioning said unitary ramp to allow said at least one in drive ramp to receive said at least a portion of said head assembly.

34. The method of claim 33, wherein said shipping comb of said unitary ramp is not removed after assembly of said disk drive assembly.

35. The method of claim 33, wherein said shipping comb of said unitary ramp is removed after assembly of said disk drive assembly.

36. A method of assembling a disk drive assembly comprising installing within a housing a pre-assembled assembly comprising an actuator assembly, an in drive ramp and a shipping comb, mounting a disk onto a hub within said housing, merging said disk onto said actuator assembly, and retaining said shipping comb within said housing after completing assembly of the disk drive assembly.

* * * * *